Nov. 29, 1966 C. W. WEEDFALL 3,288,471

AUTOMATIC RECORD CHANGING APPARATUS

Filed June 8, 1964 6 Sheets-Sheet 1

INVENTOR.
CLARENCE W. WEEDFALL
BY Hobbs & Easton
ATTORNEYS

AUTOMATIC RECORD CHANGING APPARATUS

Filed June 8, 1964 6 Sheets-Sheet 2

INVENTOR.
CLARENCE W. WEEDFALL
BY Hobbs & Easton
ATTORNEYS

INVENTOR.

CLARENCE W. WEEDFALL

BY Hobbs & Caton

ATTORNEYS

Nov. 29, 1966 C. W. WEEDFALL 3,288,471

AUTOMATIC RECORD CHANGING APPARATUS

Filed June 8, 1964 6 Sheets-Sheet 4

INVENTOR.
CLARENCE W. WEEDFALL
BY Hobbs & Easton
ATTORNEYS

Nov. 29, 1966 C. W. WEEDFALL 3,288,471

AUTOMATIC RECORD CHANGING APPARATUS

Filed June 8, 1964 6 Sheets-Sheet 5

INVENTOR.
CLARENCE W. WEEDFALL
BY Hobbs & Easton
ATTORNEYS

INVENTOR
CLARENCE W. WEEDFALL
BY
Brown, Jackson,
Boettcher & Dienner
ATTYS.

United States Patent Office 3,288,471
Patented Nov. 29, 1966

3,288,471
AUTOMATIC RECORD CHANGING APPARATUS

Clarence W. Weedfall, St. Joseph, Mich., assignor to V-M Corporation, Benton Harbor, Mich., a corporation of Michigan Filed June 8, 1964, Ser. No. 385,817
24 Claims. (Cl. 274—10)

This application is a continuation-in-part of my pending application Serial No. 226,986, filed September 28, 1962, entitled, Automatic Record Changing Apparatus, which application is being abandoned upon the filing of the present application.

The present invention relates to phonographs and more particularly to an automatic record changing mechanism for phonographs.

Widely used varieties of spindles in automatic record changing apparatus include rubber collars or fingered collets which are expanded by movement of the record escapement mechanism when a record is being released from a stack of records to retain the remainder of the stack on the upper end of the spindle for the next succeeding selections. Expansion of these devices causes them to engage and grip the remaining records at the periphery of the center hole and retain the records in fixed position while the mechanism performs the releasing operation for the bottom record of the stack. These types of mechanisms, including the rubber collar or collets, have been found satisfactory for new and unworn records; however, as the part of the record defining the hole becomes worn and chipped and hence slightly enlarged, the expansion of the collar or collets, regardless of adjustment, either fails to retain the worn records in their raised position or consistently applies excessive pressure to the records, and hence causes high peak loads, stalling the motor drive and resulting in undue wear and possible damage to the works mechanism and to the records. Other types of escapement mechanisms extensively in use include a compound spindle having an upper section around which the stack of records is mounted and which is integral and offset from the spindle proper, around which the turntable revolves, forming a shoulder for supporting the stack of records. The lower record is moved by various devices so that the hole in the bottom record of the stack aligns with the spindle proper and is thus allowed to drop to the turntable. All such types of mechanisms require a record support or stabilizing arm to hold the stack in a plane normal to the spindle and to kep the record stack from tipping, and consequently interfering with the travel of the record player tone arm. The record supports mentioned are expensive to manufacture and maintain and require manipulation by the user when placing records on the spindle or removing them from the turntable and spindle. Such spindle types are excessively damaging to record holes and in many instances cause the records to tip when released, falling in a plane not parallel with the turntable and resutling in damage to the sound track of the record previously deposited on the turntable.

It is therefore one of the principal objects of the present invention to provide a spindle for an automatic record changing apparatus, which includes an escapement device capable of effectively retaining the stack of records in its raised position normal to the spindle during the releasing operation with a minimum amount of motor torque and wear to the works mechanism or records and without danger of chipping or cracking the records, and which is reliable and relatively simple in construction and operation.

Another object of the invention is to provide an escapement mechanism for a record changing apparatus, which can be easily assembled and readily adjusted to maximum accuracy to obtain optimum control of the releasing operation, and which will operate effectively to control the successive releasing of the records of a stack regardless of variations in hole size and condition from one record to the next.

A further object of the present invention is to provide a record changing apparatus of the aforesaid type which will apply relatively constant gripping pressure to positively hold the records of a stack in their raised position while the bottom record is being released, but which embodies a yieldable means effective during the operation of the mechanism to prevent forced operation, and hence avoid damage to the records in the event the mechanism is not performing properly.

Another object is to provide a compact, relatively simple spindle and escapement mechanism which can be incorporated in automatic record changing apparatus of conventional construction and which is relatively easy to fabricate, assemble and service using standard tools and equipment.

Another object of the invention is to provide a spindle for an automatic record changer, which can be easily loaded and unloaded and which does not require a separate record support or stabilizing arm.

Another object is to provide a spindle of the aforesaid type in which the records are maintained in a stack on a plane substantially perpendicular to the axis of the spindle, and which is adapted to lower each record to an intermediate position to permit the tone arm to feel and gauge the size of the record, permitting the desirable intermixing of various diameter records in the stack.

Still another object is to provide a rugged spindle and escapement device for an automatic record changer, which assist in the separation of the records and eliminate the delay or holding action created by vacuum or a suction action.

Additional objects and advantages of the present invention will become apparent from the following description and accompanying drawings, wherein.

Figures 1, 3:
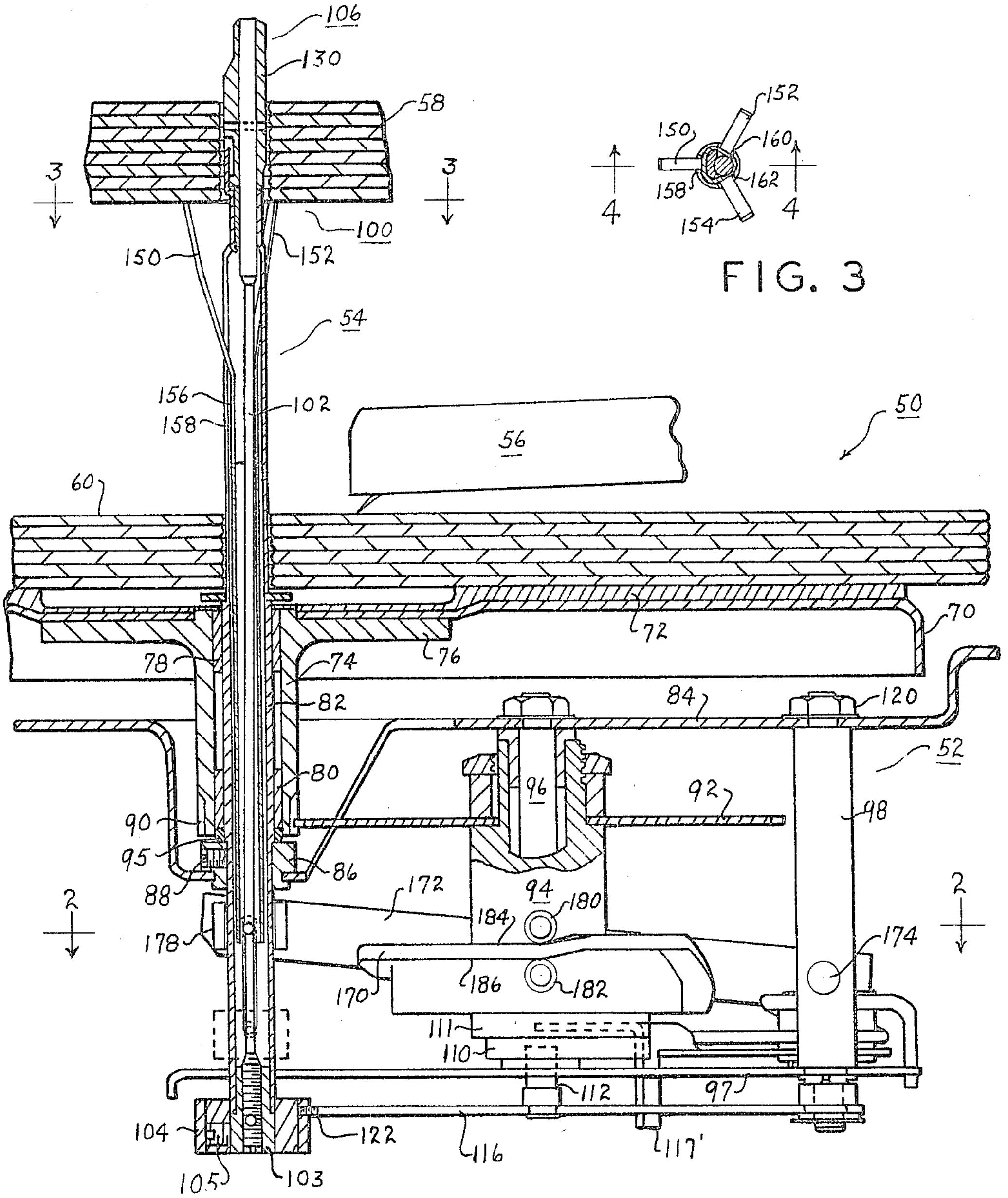
FIGURE 1 is a vertical cross sectional view through an automatic record changing apparatus embodying the present invention.
FIGURE 3 is a horizontal cross sectional view taken on line 3—3 of FIGURE 1, showing details of the spindle and escapement mechanism of the record changer.
Figure 2:
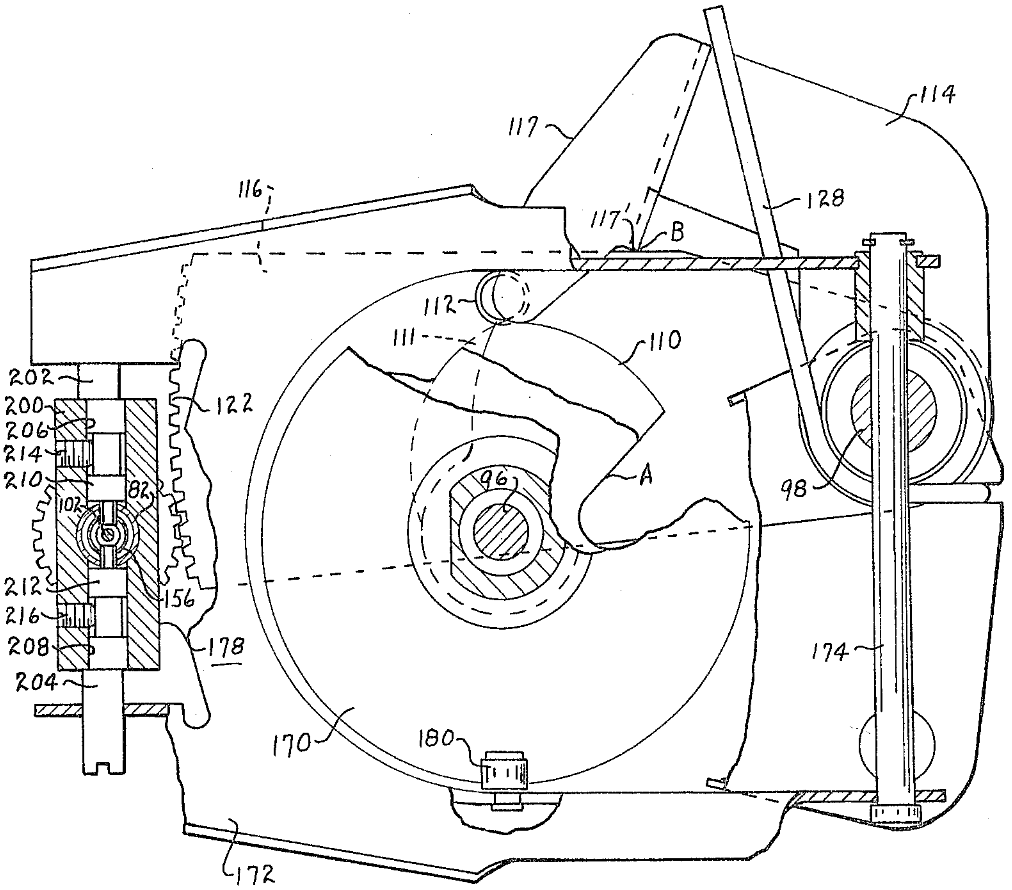
FIGURE 2 is a horizontal cross sectional view of the apparatus shown in FIGURE 1, the section being taken on line 2—2 of the latter figure.
Figure 25:
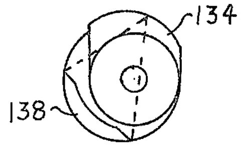
Figure 10:
Figure 9:
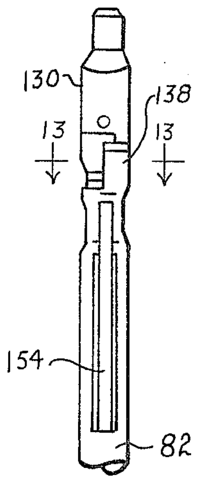
Figure 12:
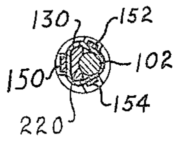
Figure 11:
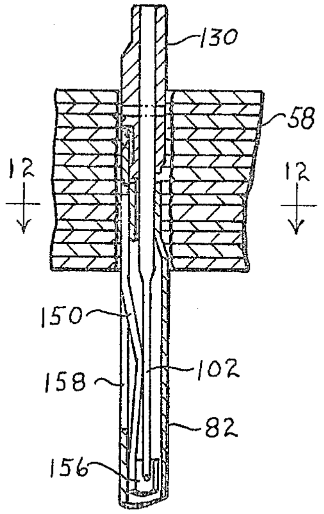
Figure 13:
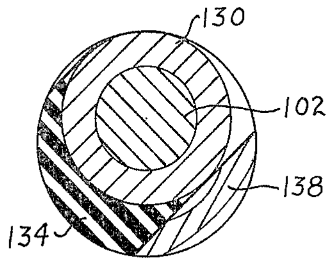
Figures 14, 15, 16, 17, 18, 19, 20, 21, 22, 23, 24:
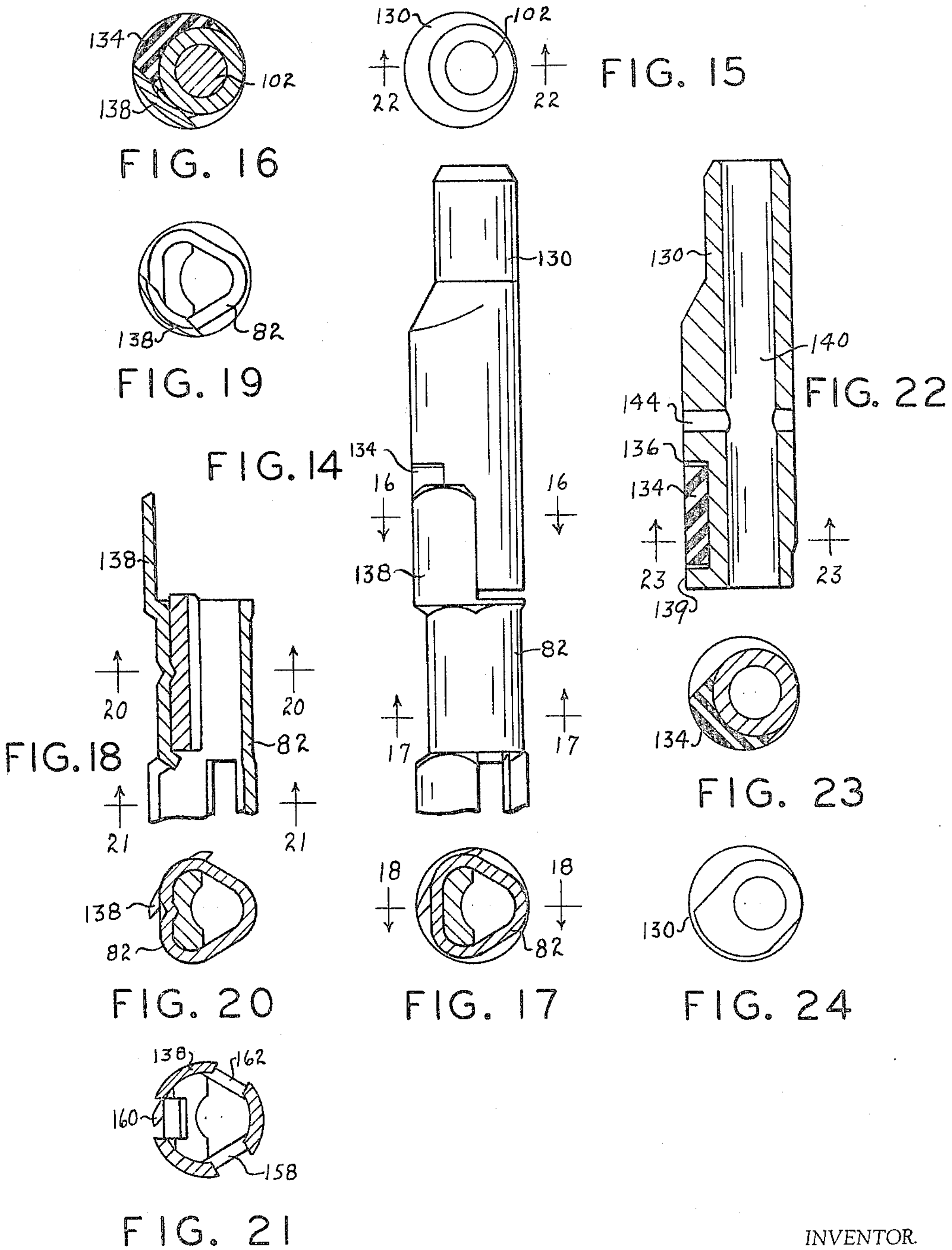
Figures 29, 30, 31:
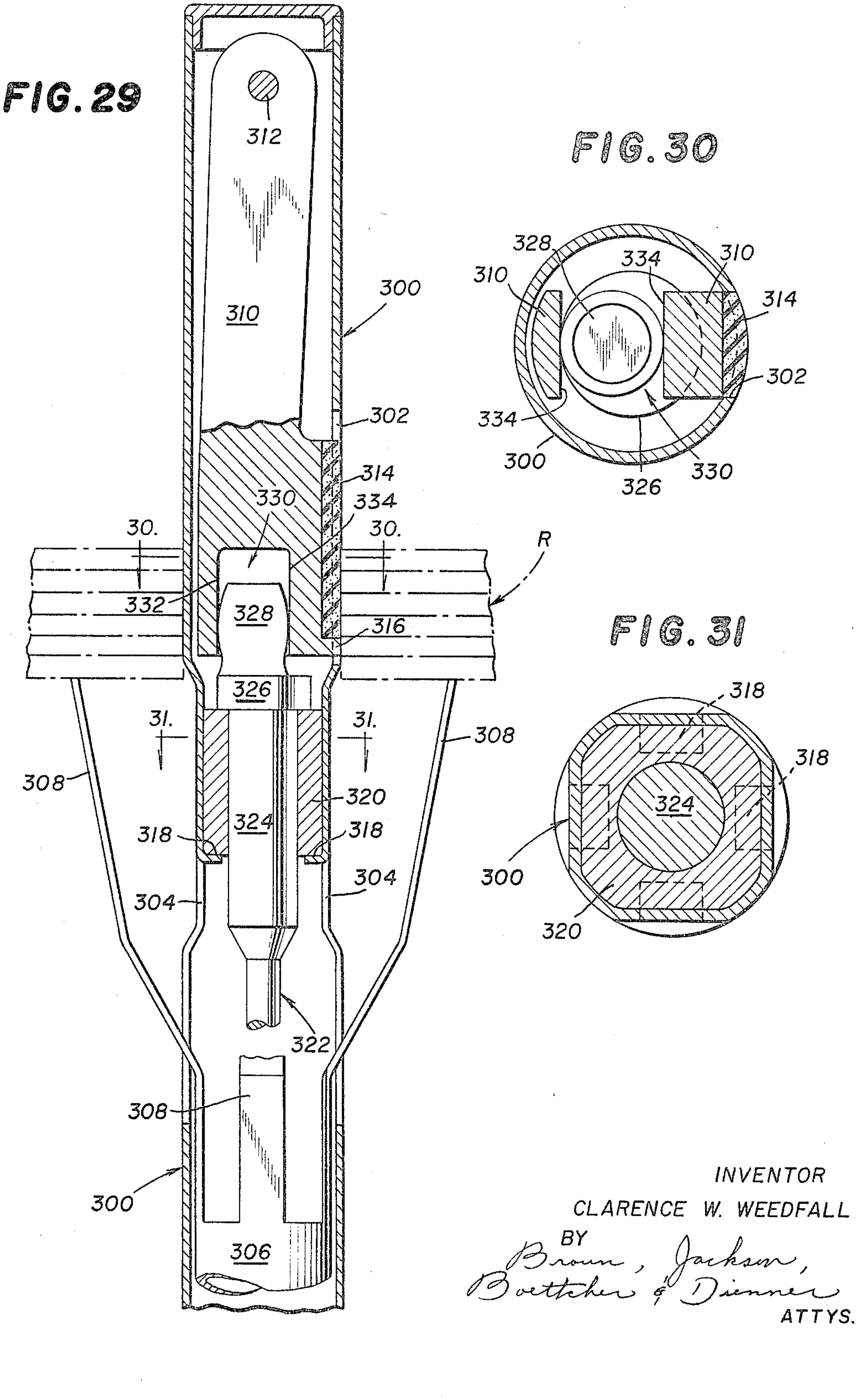

FIGURES 4, 5, 6, 7 and 8 are vertical cross sectional views of the spindle and escapement device shown in FIGURES 1, 2 and 3, the sections being taken on line 4—4 of FIGURE 3, the figures showing various stages of operation of the record changer;

FIGURE 9 is a fragmentary elevational view of the upper end of the spindle viewed from the left as shown in FIGURE 1;

FIGURE 10 is a top plan view of the spindle shown in FIGURE 9;

FIGURE 11 is a vertical cross sectional view of the upper end of the spindle similar to that shown in FIGURE 1, illustrating a further step in the operation of the record changing apparatus;

FIGURE 12 is a horizontal cross sectional view of the spindle shown in FIGURE 11, the section being taken on line 12—12 of the latter figure;

FIGURE 13 is a horizontal cross sectional view of the present escapement device, the section being taken on line 13—13 of FIGURE 9;

FIGURE 14 is an enlarged front elevational view of the record retaining portion of the escapement device shown in FIGURE 1;

FIGURE 15 is a top plan view of the device shown in FIGURE 14;

FIGURE 16 is a horizontal cross sectional view taken on line 16—16 of FIGURE 14;

FIGURE 17 is a horizonal cross sectional view taken through the upper end of the spindle shaft on line 17—17 of FIGURE 14;

FIGURE 18 is a vertical cross sectional view through the upper end of the spindle shaft of the holding mechanism shown in FIGURE 14, the section being taken on line 18—18 of FIGURE 17;

FIGURE 19 is a top plan view of the element shown in FIGURE 18;

FIGURE 20 is a horizontal cross sectional view taken on line 20—20 of FIGURE 18;

FIGURE 21 is a horizontal cross sectional view taken on line 21—21 of FIGURE 18;

FIGURE 22 is a vertical cross sectional view of the stem contained in the holding mechanism shown in FIGURE 14, the section being taken on line 22—22 of FIGURE 15;

FIGURE 23 is a horizontal cross sectional view taken on line 23—23 of FIGURE 22;

FIGURE 24 is a bottom plan view of the element shown in FIGURE 22;

FIGURES 25, 26, 27 and 28 are diagrammatical top plan views of the present holding mechanism shown in FIGURE 14, showing various stages of operation of the holding mechanism;

FIGURE 29 is an enlarged vertical sectional view, partly broken away, of a record changer spindle constructed in accordance with an alternative embodiment of the present invention;

FIGURE 30 is a horizontal section taken substantially along the line 30—30 of FIGURE 29; and FIGURE 31 is a horizontal section taken substantially along the line 31—31 of FIGURE 29.

Referring more specifically to the drawings, numeral 50 indicates generally the automatic record changing device embodying the present invention, 52 the cycling works mechanism driven through the turntable by a drive mechanism (not shown), 54 the spindle, 56 a fragmentary view of the tone arm, 58 a stack of records positioned on the spindle for being released to the turntable, and 60 a stack of records, including those previously played and the one being played. While the invention is primarily embodied in the spindle, the other foregoing mechanisms are included herein for the purpose of giving a full understanding of the construction and operation of the invention, although these mechanisms will not be described in detail herein.

The turntable 70 consisting of a conventional disc-shaped plate with an insulating material 72 on the upper surface thereof is supported by a hub 74 having an annular flange 76 on which the turntable is mounted and including an upper bearing 78 and a lower bearing 80 journalled on spindle shaft 82, the shaft being supported on base 84 by collar 86. The collar is rigidly secured to the lower portion of base 84 and is firmly held to shaft 82 by a set screw 88. The lower end of hub 74 is provided with a set of gear teeth 90 adapted to mesh with drive gear 92, the latter gear being integrally connected to cam assembly 94 which revolves about the stud shaft 96. Drive gear 92 is driven by turntable 70 which in turn is driven by a suitable electric motor (not shown). Hub 74 is rotatably supported on shaft 82 by a suitable thrust bearing 95 on collar 86 at the lower end of the hub. The perpendicular position of the spindle shaft to base 84 is held by its support in subplate 97 which is rigidly held to base 84 by spacer studs or shafts 96 and 98.

The spindle 54 consists of hollow shaft 82 extending substantially the full length thereof and housing the operating mechanism for the present record escapement device 100. Shaft 82 is held firmly in position on base 84 by collar 86 and does not rotate with turntable 70. The escapement device 100 is mounted on the upper end of shaft 82 and is rotated between the record gripping and record non-gripping positions by a rod 102 extending downwardly through shaft 82 to the lower end thereof where it is secured to an internally threaded radial thrust bearing 103 having an end extension for mounting and securing a gear 104 or other actuating means. Operational end clearance of the assembly integrally connected to shaft 102 and that of spindle 82 can be adjusted and locked in position by set screw 105. Member 106 of the escapement device, designed primarily for aligning the stack of records 58 with spindle 54 and retaining the stack of records in its raised position while the bottom record is being removed therefrom, is rotated positively by a cam 110 mounted on shaft 96, through cam follower 112 mounted on sector gear 116, during its return from gripping position to non-gripping or starting position as shown in FIGURE 1. The timing of its movement from the non-gripping or starting position to the gripping position is controlled by the sharp drop A in cams 110 and 111, permitting follower 112 to allow sector gear 116 to move inwardly, assisted by spring loaded lever 114 actuated by cam 111 through follower 117 rigidly joined to lever 114, which also includes a projection 117′ which contacts sector gear 116 at point B. Lever 114 is pivoted on stud 98, the stud being rigidly mounted between base 84 and subplate 97 and supported thereon by a threaded extension of the stud and a nut 120. The gear teeth 122 of gear sector 116 mesh with gear 104 mounted on bearing 103 rotating in the lower end of shaft 82 and secured to the lower end of rod 102 by adjustable means for rotation therewith. It is thus seen that as cam follower 112 is actuated by cam 110, the gear sector is moved upwardly or downwardly, as viewed in FIGURE 2, thereby rotating gear 104, shaft 102 and member 106 of the record holding mechanism. The cam followers are yieldably urged against the periphery of the cams 110 and 111 by a spring 128, the spring being wound around stud 98 and anchored at one end to sub-base 97 and contacting cam follower 117 mounted on lever 114 at the other end. This permits nearly constant torque to be transmitted to the eccentric holding means within the centering hole of the records, regardless of the size of the holes due to wear. In the event any malfunctioning should develop in the escapement mechanism 100, the spring permits the cam follower, and consequently the gear sector, to yield sufficiently to avoid damaging the mechanism or records. Cam action on spring loaded lever 114 and follower 117 is advanced for a considerable distance ahead of the non-gripping lead of cam 110 to reduce the peak load. This can be done due to the stick angle of eccentric locking of records.

One of the principal features of the present invention is the manner in which the stack of records is retained in the raised position while the bottom record is removed therefrom. This mechanism consists of a stem 130 mounted on the upper end of the rotatable shaft 102 and journalled in the upper end of the shaft 82 in an offset relationship to the axis thereof, thus, as stem 130 is rotated by shaft 102 from a position in substantial axial alignment with the shaft, it is offset laterally therefrom. Stem 130 is provided with a resilient cushion insert 134 seated in recess 136 and firmly secured to stem 130. Positioned on substantially the same plane as the insert is an extension 138 of shaft 82, which forms one of the record gripping elements, the lower face 139 of stem 130 and rubber insert 134 forming the other gripping elements as the stem is rotated from a retracted position concentric with respect to shaft 82 to an extended position offset with respect to the shaft on the side opposite to extension 138. A longitudinal bore 140 positioned eccentrically with respect to the axis of stem 130 as shown in FIGURE 22, receives the enlarged upper end of shaft 102, which is held in fixed position with respect to the stem by a pin extending through hole 144 of the stem.

Figure 26:
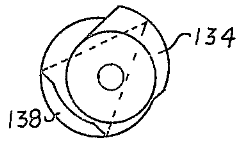
Figure 27:
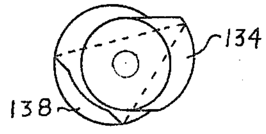
Figure 28:
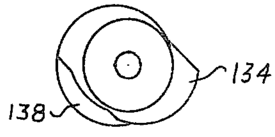

The diagrammatical views in FIGURES 25, 26, 27 and 28 show theoretical contact between surface 139 on stem 130 in relation to extension 138. It should be noted that the diameter between the thrust end of stem or sleeve 130 and the lower surface in recess 136, shown in plan view in FIGURE 24, is slightly less than the main diameter of the stem and rubber insert. This is to permit the eccentric stem or sleeve to rotate approximately 45° before contacting the smallest size hole in the record which freely passes over sleeve 130. Dotted lines show the theoretical pressure point on sleeve 130 and the two reaction points on extension 138. FIGURES 26 and 27 show sleeve rotation of 90° and 135°, respectively, which will provide the necessary grip on records with larger hole sizes than mentioned above. FIGURE 28 shows extreme rotation of 180° which is the gripping position assumed when no record is left on the spindle in stack 58. This extreme position is used to operate an additional mechanism, not shown, to automatically shut off the record player after the last record has been played. The rubber insert 134 is designed to assist in suporting record stack 58 and to stabilize the stack while applying pressure and compensating for the hole variations in records, and also to prevent records from hanging up on the shoulder formed by the recess, as would occur if no rubber were used.

The upper end of sleeve 130 is turned concentric with bore 140 to provide means for locating a 45 r.p.m. adapter spindle of new design. Separator blades are operated by the eccentric means provided by the outside diameter of the sleeve and its rotation of 180°.

Three flexible struts 150, 152 and 154 form a part of the escapement device 100 and are adapted to hold a stack of records 58 during a certain portion of the cycle of operation and to assist in the removal of the bottom record of the stack during another portion of the operating cycle. These three struts are joined integrally to a sleeve 156 disposed in shaft 82 around shaft 102 and movable longitudinally in shaft 82. The three struts extend outwardly through slots 158, 160, and 162, respectively, in shaft 82, and the lower ends of the slots form guide members for the struts so that as the sleeve 156 is lowered in shaft 82, the bottoms of the slots causes the struts to move inwardly in substantial alignment with the external surface of shaft 82, thereby permitting the bottom record to pass over the struts in falling to its playing position on stack 60.

Figure 7:
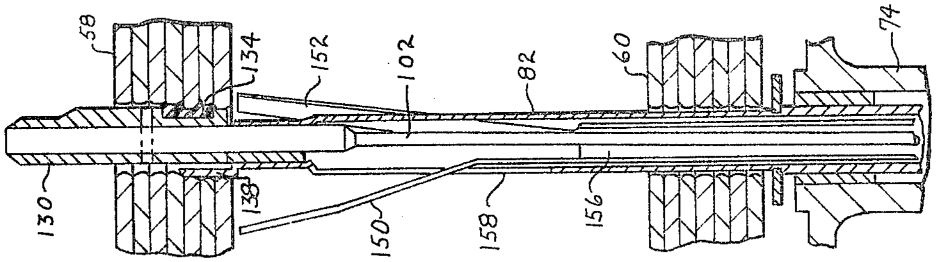
Figure 6:
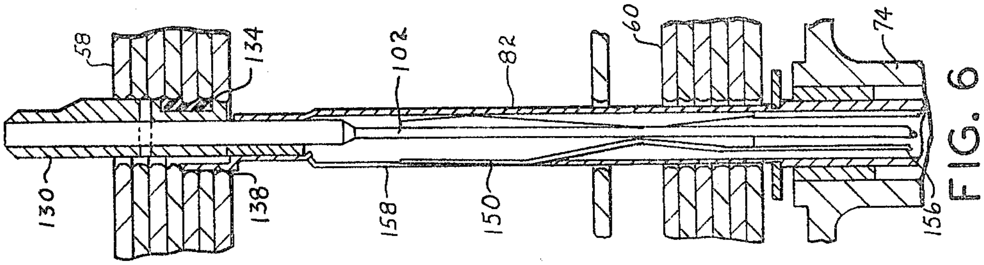
Figure 5:
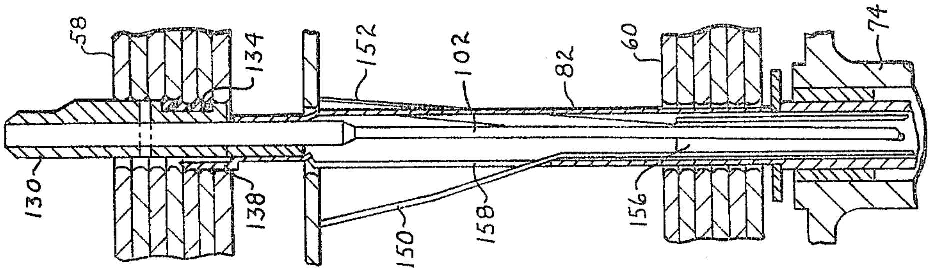

Struts 150, 152 and 154 are operated between the position shown in FIGURE 1 and the positions shown in FIGURES 5, 6 and 7 by shifting sleeve 156 upwardly and downwardly. The operation of the sleeve between the four positions is performed by elevating cam 170 rotatably mounted on shaft 96 and operating lever 172, whtich is pivoted around bolt 174 anchored in spacer studs 98 and 98' and connected to the lower end of sleeve 156 by pins in pin housing 178 to which lever 172 is pivotally connected, as will be more fully described hereinafter. Cam follower rollers 180 and 182 which are mounted on lever 172 engage the upper and lower surfaces 184 and 186, respectively, of cam 170, thereby imparting a positive upward and downward movement to sleeve 156, and consequently to struts 150, 152 and 154. All the cams are integral with cam assembly 94 and gear 92 and rotate as an assembly around shaft 96 which is rigidly supported between sub-base 97 and base plate 84.

The actuating pin housing 178 is so constructed and designed that the position of the top surface of struts 150, 152 and 154 can be readily adjusted with respect to the thrust surface of stem 130, thereby controlling the maximum thickness of the record to be separated from the bottom of stack 58 and obtaining optimum operation of the escapement device. The housing consists of a block 200 having pins 202 and 204 projecting outwardly from the ends thereof for receiving the respective opposite sides of lever 172. Pins 202 and 204 are seated in concentric bores 206 and 208, respectively, and the outer ends of the two pins are offset eccentrically with relation to the inner ends 210 and 212, respectively. The inner ends are provided with recesses for receiving the inner ends of set screws 214 and 216 for retaining the pins in place radially and for locking the pins in place after a vertical adjustment has been made. The outer ends of the two pins are provided with slots for use in making adjustments. The inner ends of pins 202 and 204 extend inwardly through the wall of sleeve 156 so that the sleeve moves upwardly and downwardly with the housing. A dimensional relation is made from the eccentric shoulders of pins 202 and 204 to the ends of the pins projecting into sleeve 156 and those of block 200. When shaft 82 and sleeve 156 are assembled in the block, they are rotated and elevated while finger pressure is applied in a squeezing direction until the pin ends find their respective slots and holes. When the pin eccentric shoulders contact the block, there will be sufficient clearance between the ends of the pins to permit rotation of shaft 102. After the actuating pin housing 178, lever 172 and spindle 54 have been assembled in the foregoing manner, set screws 214 and 216 are loosened, and the height of sleeve 156 is adjusted by rotating pins 202 and 204. Adjustment should provide the proper space between the top side of struts 150, 152 and 154 in relation with the thrust side of the sleeve to provide minimum clearance for the thickest record intermixed in stack 58. This clearance permits the thrust surface side of stem 106 to clear the top side of the lowermost record in stack 58 and permits the eccentric locking surface 139 to engage the center hole of the second lowermost record in the stack, thus permitting a free release of the lowermost record, as illustrated in the sequence of operations for releasing a record to the turntable shown in FIGURES 4 through 8. It is seen that the offset relationship of the outer ends of the two pins to their inner ends, causes the lever and the lower end of the sleeve to move upwardly and downwardly relative to one another as the pins are rotated. After the desired adjustment and alignment with lever 172 have been obtained, set screws 214 and 216 are tightened inwardly against the two pins, holding the pins firmly in their adjusted position.

Figure 4:
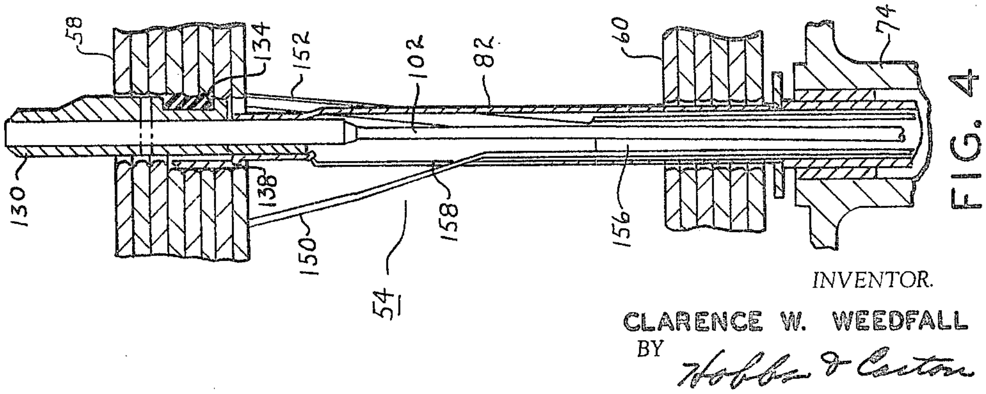

In the operation of the foregoing automatic record changing apparatus, a stack of records 58 is placed on the spindle with struts 150, 152 and 154 in their raised position as illustrated in FIGURE 1, and with the record holding stem positioned concentrically with shaft 82. This is the stopping and starting position of the cycle of operations performed by works mechanism 52. The starting cycle is performed by a manually actuated control switch or by an automatic trip mechanism, as commonly used for record changers, which causes the gear 92 and cam assembly 94 to revolve one revolution per cycle of operation by means of the motor driven turntable 70. In proper sequence, a lift pin raises tone arm 56 from the record being played or from post position, if the record changer is turned on, and swings the tone arm out and away from the spindle and record. During this time, the first step, as shown in FIGURE 4, takes place, resulting from the operation of sector gear 116 as its cam follower roller 112 follows the steep cam lead on cam 110 at point A and assisted by spring actuated lever 114 to rotate gear 104, which in turn rotates shaft 102 and member or stem 106. Rotation of the stem positions the stem eccentrically with respect to shaft 82 and thus causes stem surface 139 and rubber insert 134 to engage their respective records inside their center holes, forcing the records laterally, causing the opposite side of the holes to engage extension 138 on the upper end of shaft 82. It is thus seen that the offset relationship of stem 130 with respect to extension 138 permits a firm grip on several of the lower records of the stack, with the exception of the bottom record, thereby holding the stack firmly and squarely in position on the upper end of the spindle. It should also be observed that the resilient rubber insert 134 bonded to stem 130 adjusts to the various hole sizes in the records above the second lowermost record, and that eccentric face 139 does not engage the hole of the third lowermost record.

Figure 8:
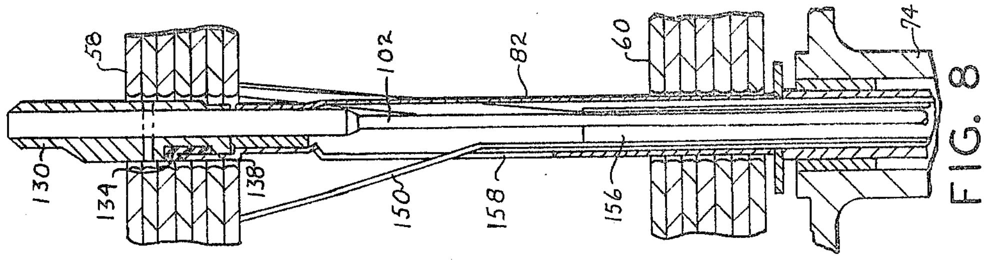

While the stack is being thus held by the eccentrically positioned stem, cam 170 lowers lever 172, sleeve 156 and struts 150, 152 and 154, thereby positioning the bottom record in the position shown in FIGURE 5, where the return of the tone arm in the direction of the spindle determines the size of the record and adjusts the works mechanism for the proper positioning of the tone arm set down. The tone arm then returns to its extreme outward travel, and further rotation of cam 170 then moves sleeve 156 further downwardly, causing struts 150, 152 and 154 to retract inwardly into hollow shaft 82, the lower edges of slots 158, 160 and 162 causing the struts to fold inwardly into shaft 82, as illustrated in FIGURE 6, thereby fully releasing the bottom record which drops to the turntable or onto the stack on the turntable for playing. During the operation performed in FIGURES 5 and 6, stem 130 remains in its eccentric position, thus retaining the stack of records 58 in its raised position on the spindle. After the bottom record has reached the turntable, further rotation of cam 170 returns sleeves 156 and the struts to their highest position as shown in FIGURE 7, the upper ends of the struts being in close proximity to stack 58 which is still being gripped by stem 130, and the struts at this point projecting outwardly and being spaced downwardly from the bottom record of the stack. Sector gear 116 positively moved by cam 110 is then rotated to return stem 130 to its original position concentric with the shaft as shown in FIGURE 8, thus releasing the stack of records and permitting the stack to rest on the upper ends of the struts 150, 152 and 154, which have been previously positioned as shown in FIGURE 7. Near the end of the completed cycle, cam 170 lowers lever 172, sleeve 156 and struts 150, 152 and 154 with their load of records in stack 58 to the starting point or end of the cycle, as shown in FIGURE 1, thus completing the full cycle of releasing the bottom record of stack 58 to the turntable. After the operation shown in FIGURE 6 and during the time for operations shown in FIGURES 1, 7 and 8, the tone arm returns to its predetermined position and rests on the record. After the record has been played, the foregoing operation cycle is repeated until automatically or manually stopped. While in the stop and start position, as shown in FIGURE 1, record stack 60 can be removed from the turntable by lifting it upwardly on the spindle, causing the struts to fold inwardly within the holes of the records in the stack, as shown in FIGURE 11, and permitting the stack to be lifted free of the spindle. It should be noted, as shown in FIGURE 12, that the upper ends of the struts fold into the triangular clearance provided in spindle 82 surrounding the enlarged upper end of shaft 102 and bearing 220.

An alternative embodiment of the present invention is illustrated in FIGURES 29–31 where there is shown a tubular spindle body or shaft 300 having an upper vertical slot 302 formed therein and also a plurality of circumferentially spaced lower vertical slots 304. A tube or sleeve 306 is vertically slidable within the spindle body 300 and has a plurality of struts or record supporting fingers 308 which are integral with the upper end of the sleeve 306 and extend upwardly and outwardly therefrom through respective ones of the vertical slots 304. The record supporting struts 308 are shown in their normal operative positions in FIGURE 29 wherein they support a stack of records R, and it will be understood that during a record change cycle the sleeve 306 will be moved downwardly and the struts 308 will engage the lower ends of the slots 304 and be cammed inwardly to radially retracted inoperative positions thereby permitting the lowermost record in the stack R to be dropped to a turntable for playing. The mechanism for supporting all but the lowermost record during a record change cycle will now be described hereinbelow.

A secondary record supporting member comprises a pivotally mounted lever arm 310 which is supported from a pin 312 and carries a resilient pad 314 adjacent its lower end. The cross pin 312 extends through the tubular spindle body or shaft 300 proximate the upper end of the latter so as to be supported thereby, and the pin 312 is oriented so that the lower end of the arm 310 which carries the pad 314 will move toward and away from the vertical slot 302 in the spindle body 300 when the arm is pivoted on the pin. An extension or radial flange portion 316 is integral with the lower end of the arm 310 and extends radially outwardly therefrom toward the slot 302 proximate the lower end of the latter. The flange 316 is disposed immediately beneath the resilient pad 314, and the radially outermost surface of the flange 316 is approximately flush with the radially outermost surface of the pad 314.

The tubular spindle body or shaft 300 has a plurality of inwardly struck tabs 318 which are integral with the spindle body proximate the upper ends of the slots 304 and extend radially inwardly therefrom in order to support a bearing sleeve 320. An actuating rod 322 is concentrically disposed within the spindle body or shaft 300 and extends upwardly through the bearing 320 in which it is rotatable. As shown in the drawings, the rod 322 has a large diameter portion 324 disposed within the bearing sleeve 320, and at the upper end of the portion 324 there is provided a supporting flange 326 which partially overlies the upper end of the bearing. An eccentric knob or rod extension 328 extends upwardly from the flange 326 and projects into a transverse slot or recess 330 formed in the lower end of the pivotally mounted arm 310 so as to be engageable with side walls 332 and 334 of the slot.

In operation, the primary record supporting fingers or struts 308 are normally positioned as shown in FIGURE 29 to support a stack of records R which have been threaded downwardly over the upper end of the spindle body 300, and the eccentric 328 is normally disposed in the position shown wherein the pivotally mounted arm 310 is retracted within the spindle body 300 and the flange 316 and resilient pad 314 do not press against the records on the spindle. At the beginning of a record change cycle, the rod 322 is rotated so as to move the eccentric 328 in the slot 330 and also to the right as viewed in FIGURE 29, thereby causing the flange 316 and the resilient pad 314 to be moved radially outwardly through the slot 302 and into engagement with the stack of records R at the peripheries of the centerholes thereof. The flange 316 is located relative to the upper ends of the primary record supporting fingers or struts 308 so that it will engage only at the centerhole of the next-to-lowermost record, while the resilient pad 314 will engage against several of the records disposed above the next-to-lowermost record, and all records thus engaged will be urged to the right so as to be pulled against the left side of the spindle body 300 opposite the slot 302, whereby the spindle body acts as a fixed brace. The flange portion 316 will make firm engagement at the periphery of the centerhole of the next-to-lowermost record, regardless of variations in the sizes of the record centerholes, since the resilient pad 314 will yield any amount which may be necessary to permit such engagement. In addition, the pad 314 through its engagement with several records above the next-to-lowermost record will assist in supporting the stack of records R.

Once the secondary supporting member 310 has been actuated to an operative extended position as described above, the sleeve 306 is lowered to withdraw the primary supporting fingers or struts 308 to radially retracted inoperative positions, thereby permitting the lowermost record R to be dropped to a turntable for playing. The struts 308 are then returned to their operative record supporting positions, and thereafter the rod 322 is rotated back to its original position as shown in FIGURE 29, whereby the pad 314 and flange 316 are radially retracted, and the stack of records R is again supported by the struts 308. It will be understood that the sleeve 306 and record supporting struts 308 may be actuated in the same manner as the record supporting struts 150, 152 and 154 described earlier herein. In addition, any suitable mechanism may be utilized to rotate the rod 322 between its operative and inoperative positions, and if desired the rod 322 may be actuated by mechanism such as described earlier herein for actuating the rotatable rod member 102.

In summary, an important aspect of the present invention relates to the mechanism for supporting all but the lowermost one of a stack of records on a record changer spindle when the lowermost record is to be dropped to a turntable for playing. In one embodiment described herein, as illustrated in FIGURES 1–28, the records are supported by pulling them against a fixed brace which comprises the extension 138 on the tubular spindle body or shaft 82. The particular structure for pulling the records against the fixed brace 138 comprises a rotatable eccentric stem 130. The stem 130 has a rigid lower face or flange portion 139 which is positioned to engage against the periphery of the centerhole of the next-to-lowermost record, and above the flange 139 there is disposed a resilient insert or pad 134 which is carried on the stem 130 and is positioned to engage at the centerholes of several records above the nxet-to-lowermost record. The flange 139 will engage firmly against the periphery of the centerhole of the next-to-lowermost record, regardless of variations in the centerhole diameters. Because the pad 134 will yield when necessary to permit such engagement, and the pad 134 will assist in supporting the stack of records.

When the rod 102 on which the stem 130 is mounted is rotated to its normal position, as shown in FIGURES 1 and 8, the stem 130 is approximately concentric with the spindle body 82, and records can be freely threaded downwardly over the extension 138 and the stem 130. During a record change cycle, when the eccentric rod 102 is rotated, the stem 130 which is eccentric relative to the rod 102 is moved laterally outwardly to pull the records against the fixed brace 138, as shown for example in FIGURES 4–7. In order to obtain the desired movement of the record gripping elements on the stem 130 between laterally retracted and laterally extended positions, in an embodiment of the type described, the stem 130 should be eccentric relative to its axis of rotation, i.e., the axis of the rod 102, and the rod 102 itself should be eccentric relative to the tubular spindle body or shaft 82.

With respect to the second embodiment illustrated in FIGURES 29–31, the operation is the same as in the first embodiment to the extent that the records are supported by being engaged at the peripheries of their centerholes and pulled against a portion of the tubular spindle body or shaft which acts as a fixed brace. In this instance, the spindle body 300 extends upwardly the full length of the spindle mechanism, and the records to be supported are pulled against a portion of the spindle body 300 opposite the slot 302. A rotatable eccentric member 328 is provided to effect gripping of the records, but in this instance the eccentric member does not itself carry any record gripping elements. Thus, in addition to the spindle body 300, the record gripping elements are the resilient pad 314 and the rigid flange portion 316, both of which are a part of or are carried on the pivotally mounted depending arm 310, and the eccentric 328 moves in a slot 330 in the arm 310 and serves to actuate the arm between retracted and extended positions. In this embodiment, the rod 322 which carries the eccentric 328 is concentric relative to the spindle body 300, and thus the member 328 is eccentric with respect to the spindle body in all of its positions. However, the eccentric 328 actuates the arm 310 between an inoperative position where the pad 314 and flange 316 are substantially retracted and do not press against the records, and an operative position where the pad 314 and flange 316 project out through the slot 302 to engage the records and pull them against the spindle body 300 at the side thereof opposite the slot 302.

While certain preferred forms of my invention have been described and illustrated, it will be appreciated that modifications and changes may be made therein by those skilled in the art, particularly with my disclosure before them, and thus I do not intend to be limited to the particular disclosure, except insofar as the appended claims are so limited.

I claim:

1. In an automatic record changing apparatus: a base, a vertically positioned spindle assembly secured to said base, said spindle assembly including a hollow shaft fixedly secured to said base extending substantially the full length of said assembly, a stem mounted adjacent the upper end of said shaft on a pivot eccentric to said shaft and having positions concentric and eccentric with respect to said shaft, a resilient insert secured to one side of said stem adjacent the lower end thereof, an extension on said shaft projecting upwardly along the side of said stem, said insert and extension forming elements for gripping a stack of records on said spindle assembly, a rod connected to said stem and extending downwardly through said shaft, means for oscillating said rod and stem between record gripping and non-gripping positions, a plurality of struts projecting upwardly and outwardly from said hollow shaft, and a sleeve in said shaft connected to the lower ends of said struts for moving said struts between a record supporting position and a record releasing position within said shaft.

2. In an automatic record changing apparatus: a spindle assembly comprising a hollow shaft fixedly secured to said base extending substantially the full length of said assembly, a stem mounted adjacent the upper end of said shaft on a pivot eccentric to said shaft and having positions concentric and eccentric with respect to said shaft, a resilient insert secured to one side of said stem adjacent the lower end thereof, an extension on said shaft projecting upwardly along the side of said stem, said insert and extension forming elements for gripping a stack of records on said spindle assembly, a rod connected to said stem and extending downwardly through said shaft for oscillating said stem between record gripping and non-gripping positions, a plurality of struts projecting upwardly and outwardly from said hollow shaft, and a sleeve in said shaft connected to the lower ends of said struts for moving said struts between a record supporting position and a record releasing position within said shaft.

3. A spindle assembly for an automatic record changing apparatus, comprising a hollow shaft, a stem mounted adjacent the upper end of said shaft on a pivot eccentric to said shaft and having positions concentric and eccentric with respect to said shaft, a resilient insert secured to one side of said stem adjacent the lower end thereof, an extension on said shaft projecting upwardly along the side of said stem, said insert and extension forming elements for gripping a stack of records on said spindle assembly, a rod connected to said stem and extending downwardly through said shaft for oscillating said stem between record gripping and non-gripping positions, a plurality of struts projecting upwardly and outwardly from said hollow shaft, and means for moving said struts between a record supporting position and a record releasing position within said shaft.

4. A spindle assembly for an automatic record changing apparatus, comprising a hollow shaft, a stem mounted adjacent the upper end of said shaft on a pivot eccentric to said shaft and having positions concentric and eccentric with respect to said shaft, a flange means at the lower end of said stem, a resilient insert secured to one side of said stem adjacent said flange means, an extension on said shaft projecting upwardly along the side of said stem, said insert, flange means and extension forming elements for gripping a stack of records on said spindle assembly, a rod connected to said stem and extending downwardly through said shaft for oscillating said stem between record gripping and non-gripping positions, a plurality of struts projecting upwardly and outwardly from said hollow shaft, and means for moving said struts between a record supporting position and a record releasing position within said shaft.

5. In a spindle assembly for an automatic record changing apparatus: an escapement device including a hollow shaft, a stem mounted adjacent the upper end of said shaft on a pivot eccentric to said shaft and having positions concentric and eccentric with respect to said shaft, a resilient insert secured to one side of said stem adjacent the lower end thereof, an extension on said shaft projecting upwardly along the side of said stem, said insert and extension forming elements for gripping a stack of records on said spindle assembly, and a rod connected to said stem and extending downwardly through said shaft for oscillating said stem between record gripping and non-gripping positions.

6. In a spindle assembly for an automatic record changing apparatus: an escapement device including a hollow shaft, a stem mounted adjacent the upper end of said shaft on a pivot eccentric to said shaft and having positions concentric and eccentric with respect to said shaft, a flange means at the lower end of said stem, a resilient insert secured to one side of said stem adjacent said flange means, an extension on said shaft projecting upwardly along the side of said stem, said insert, flange means and extension forming elements for gripping a stack of records on said spindle assembly, and a rod connected to said stem and extending downwardly through said shaft for oscillating said stem between record gripping and non-gripping positions.

7. In a spindle assembly for an automatic record changing apparatus: an escapement device including a shaft, a stem mounted adjacent the upper end of said shaft on a pivot eccentric to said shaft and having positions concentric and eccentric with respect to said shaft, a resilient insert secured to one side of said stem, an extension on said shaft projecting upwardly along the side of said stem, said insert and extension forming elements for gripping a stack of records on said spindle assembly, and means for oscillating said stem between record gripping and non-gripping positions.

8. In a spindle assembly for an automatic record changing apparatus: an escapement device including a shaft, a stem mounted adjacent the upper end of said shaft on a pivot eccentric to said shaft and having positions concentric and eccentric with respect to said shaft, a resilient insert secured to one side of said stem adjacent to but spaced upwardly from the lower end thereof, an extension on said shaft projecting upwardly along the side of said stem, said insert, extension and lower end of said stem forming elements for gripping a stack of records on said spindle assembly, and means for oscillating said stem between record gripping and non-gripping positions.

9. A spindle assembly for an automatic record changing apparatus, comprising a hollow shaft, a stem pivotally mounted at the upper end of said shaft, a pivot means eccentric to said shaft for moving said stem between a position in alignment with said shaft and a position offset therefrom, a resilient insert secured to one side of said stem adjacent the lower end thereof, a portion of said shaft projecting upwardly along the side of said stem opposite said insert, said insert and portion forming a means for gripping a stack of records on said spindle assembly, a rod means connected to said pivot means and extending downwardly through said shaft for moving said stem between record gripping and non-gripping positions, a plurality of struts projecting upwardly and outwardly from said hollow shaft, and means for moving said struts between a record supporting position and a record releasing position within said shaft.

10. A spindle assembly for an automatic record changing apparatus, comprising a hollow shaft, a stem pivotally mounted at the upper end of said shaft, a pivot means eccentric to said shaft for moving said stem between a position in alignment with said shaft and a position offset therefrom, a resilient insert secured to one side of said stem adjacent the lower end thereof, a portion of said shaft projecting upwardly along the side of said stem, said insert and portion forming a means for gripping a stack of records on said spindle assembly, and a rod means connected to said pivot means and extending downwardly through said shaft for moving said stem between record gripping and non-gripping positions.

11. For use with an automatic record changer spindle, mechanism operable during a record change cycle for supporting all but the lowermost record in a stack of records disposed on said spindle, comprising, in combination, a fixed brace member positioned to be disposed inside the centerhole of a record to be supported on the spindle, movable record gripping means also positioned to be disposed inside the centerhole of said record, and rotatable actuating means for moving said gripping means generally toward and away from said fixed brace between a normal inoperative position wherein records may be freely threaded downwardly on the spindle over said fixed brace and said movable gripping means and an operative position wherein said gripping means is moved generally away from said fixed brace and is urged against the periphery of the centerhole of the record to be supported so as to pull said record against said fixed brace and thereby support said record.

12. The invention of claim 11 wherein said fixed brace comprises a portion of a spindle body member.

13. The invention of claim 11 wherein said gripping means includes a rigid member positioned to engage the periphery of the centerhole of the next-to-lowermost record in a stack of records disposed on said spindle, and a resilient member positioned to engage the peripheries of the centerholes of a plurality of records disposed immediately above said next-to-lowermost record.

14. For use with an automatic record changer spindle, mechanism operable during a record change cycle for supporting all but the lowermost record in a stack of records disposed on said spindle, comprising, in combination, a spindle body member having a portion thereof disposed inside the centerholes of records to be supported on the spindle, movable record gripping means also positioned to be disposed inside the centerholes of said records, said gripping means including a rigid member positioned to engage the periphery of the centerhole of the next-to-lowermost record in a stack of records disposed on said spindle and a resilient member positioned to engage the peripheries of the centerholes of a plurality of records disposed above said next-to-lowermost record, and means including a rotatable rod disposed within said spindle body and having an eccentric member proximate its upper end for effecting movement of said gripping means generally toward and away from said portion of said spindle body member between a normal inoperative position wherein records may be freely threaded downwardly on the spindle over said portion of said spindle body and said movable gripping means and an operative position wherein said gripping means is moved generally away from said portion of said spindle body and is urged against the peripheries of the centerholes of records to be supported so as to pull said records against said portion of said spindle body which acts as a fixed brace to thereby support said records.

15. For use with an automatic record changer spindle, mechanism operable during a record change cycle for supporting all but the lowermost record in a stack of records disposed on said spindle, comprising, in combination, a fixed brace member positioned to be disposed inside the centerhole of a record to be supported on the spindle, an arm pivotally mounted about a fixed axis and having record gripping means thereon also positioned to be disposed inside the centerhole of said record, and actuating means for pivoting said arm to move said gripping means generally toward and away from said fixed brace between a normal inoperative position wherein records may be freely threaded downwardly on the spindle over said fixed brace and said gripping means and an operative position wherein said gripping means is moved generally away from said fixed brace and is urged against the periphery of the centerhole of the record to be supported so as to pull said record against said fixed brace and thereby support said record.

16. For use with an automatic record changer spindle, mechanism operable during a record change cycle for supporting all but the lowermost record in a stack of records disposed on said spindle, comprising, in combination, a spindle body member having a portion thereof positioned to be disposed inside the centerhole of a record to be supported on the spindle, an arm pivotally supported for movement about a fixed axis relative to said spindle body proximate the upper end thereof and extending downwardly therefrom, gripping means on the lower end of said arm also positioned to be disposed inside the centerhole of said record, and actuating means for pivoting said arm to move said gripping means generally toward and away from said portion of said spindle body between a normal inoperative position wherein records may be freely threaded downwardly on the spindle over said portion of said spindle body and said gripping means and an operative position wherein said gripping means is moved generally away from said portion of said spindle body and is urged against the periphery of the centerhole of the record to be supported so as to pull said record against said portion of said spindle which acts as a fixed brace to thereby support said record.

17. For use with an automatic record changer spindle, mechanism operable during a record change cycle for supporting all but the lowermost record in a stack of records disposed on said spindle, comprising, in combination, a spindle body member having a portion thereof positioned to be disposed inside the centerhole of a record to be supported on the spindle, an arm pivotally supported for movement about a fixed axis relative to said spindle body proximate the upper end thereof and extending downwardly therefrom, gripping means on the lower end of said arm also positioned to be disposed inside the centerhole of said record, said gripping means comprising a rigid member positioned to engage the periphery of the centerhole of the next-to-lowermost record in a stack of records disposed on said spindle and a resilient member positioned to engage the peripheries of the centerholes of a plurality of records disposed immediately above said next-to-lowermost record, and actuating means for pivoting said arm to move said gripping means generally toward and away from said portion of said spindle body between a normal inoperative position wherein records may be freely threaded downwardly on the spindle over said portion of said spindle body and said gripping means and an operative position wherein said gripping means is moved generally away from said portion of said spindle body and is urged against the peripheries of the centerholes of records to be supported so as to pull said records against said portion of said spindle body which acts as a fixed brace to thereby support said records.

18. For use with an automatic record changer spindle, mechanism operable during a record change cycle for supporting all but the lowermost record in a stack of records disposed on said spindle, comprising, in combination, a generally tubular spindle body member having a portion thereof disposed inside the centerholes of records to be supported on the spindle, an arm pivotally supported by pivot pin means from the upper end of said spindle body and extending downwardly therefrom inside said spindle body, gripping means on the lower end of said arm positioned to be disposed inside the centerholes of said records adjacent an opening in said spindle body member, said gripping means comprising a rigid member positioned to engage the periphery of the centerhole of the next-to-lowermost record in a stack of records disposed on said spindle and a resilient member positioned to engage the peripheries of the centerholes of a plurality of records disposed immediately above said next-to-lowermost record, a recess in the lower end of said arm, a rotatable rod disposed within said spindle body and having an eccentric member on the upper end thereof which eccentric member is disposed in said recess for controlling the pivotal movement of said arm, whereby rotation of said rod will effect pivotal movement of said arm to move said gripping means generally toward and away from said portion of said spindle body opposite said opening between a normal inoperative retracted position wherein records may be freely threaded downwardly on the spindle over said portion of said spindle body and said gripping means and an operative position wherein said gripping means is moved generally away from said portion of said spindle body and outwardly through said opening so as to be urged against the peripheries of the centerholes of records to be supported and pull said records against said portion of said spindle body which acts as a fixed brace to thereby support said records.

19. For use with an automatic record changer spindle, mechanism operable during a record change cycle for supporting all but the lowermost record in a stack of records disposed on said spindle, comprising, in combination, a fixed brace member positioned to be disposed inside the centerhole of a record to be supported on the spindle, a rotatable rod eccentrically disposed within said spindle, and record gripping means also positioned to be disposed inside the centerhole of said record and eccentrically carried on said rod for rotation therewith, whereby upon rotation of said rod said gripping means is movable generally toward and away from said fixed brace between a normal inoperative position wherein records may be freely threaded downwardly on the spindle over said fixed brace and said gripping means and an operative position wherein said gripping means is moved generally away from said fixed brace and is urged against the periphery of the centerhole of the record to be supported so as to pull said record against said fixed brace and thereby support said record.

20. The invention of claim 19 wherein said fixed brace comprises a portion of a spindle body member.

21. The invention of claim 20 wherein said gripping means includes a rigid member which is positioned to engage against the periphery of the centerhole of the next-to-lowermost record in a stack of records on said spindle.

22. The invention of claim 20 wherein said gripping means comprises a stem member which is eccentrically carried on the upper end of said rod and which includes a rigid member which is positioned to engage against the periphery of the centerhole of the next-to-lowermost record in a stack of records on said spindle and a resilient member which is positioned to engage against the peripheries of the centerholes of a plurality of records disposed immediately above said next-to-lowermost record.

23. For use with an automatic record changer spindle, mechanism operable during a record change cycle for supporting all but the lowermost record in a stack of records disposed on said spindle, comprising, in combination, a spindle body member having a portion thereof positioned to be disposed inside the centerhole of a record to be supported on the spindle, movable record gripping means also positioned to be disposed inside the centerhole of said record, and a rotatable rod disposed within said spindle body and having an eccentric member proximate its upper end for moving said gripping means generally toward or away from said portion of said spindle body between a normal inoperative position wherein records may be freely threaded downwardly on the spindle over said portion of said spindle body and said grippping means and an operative position wherein said gripping means is moved generally away from said portion of said spindle body and is urged against the periphery of the centerhole of the record to be supported so as to pull said record against said portion of said spindle which acts as a fixed brace to thereby support said record.

24. For use with an automatic record changer spindle, mechanism operable during a record change cycle for supporting all but the lowermost record in a stack of records disposed on said spindle, comprising, in combination, a spindle body member having a portion thereof positioned to be disposed inside the centerhole of a record to be supported on the spindle, an arm pivotally supported from said spindle proximate the upper end thereof and extending downwardly therefrom, gripping means on the lower end of said arm also positioned to be disposed inside the centerhole of said record, said gripping means comprising a rigid member positioned to engage the periphery of the centerhole of the next-to-lowermost record in a stack of records disposed on said spindle and a resilient member positioned to engage the peripheries of the centerholes of a plurality of records disposed immediately above said next-to-lowermost record, and actuating means for pivoting said arm to move said gripping means generally toward and away from said portion of said spindle body between a normal inoperative position wherein records may be freely threaded downwardly on the spindle over said portion of said spindle body and said gripping means and an operative position wherein said gripping means is moved generally away from said portion of said spindle body and is urged against the peripheries of the centerholes of records to be supported so as to pull said records against said portion of said spindle body which acts as a fixed brace to thereby support said records, said actuating means including a rotatable rod disposed within said spindle body and an eccentric member on the upper end of said rod for engagement with the lower end of said pivotally mounted arm.

References Cited by the Examiner

UNITED STATES PATENTS

| | | | |
|---|---|---|---|
| 2,510,455 | 6/1950 | Alexandersson | 274—10 |
| 3,021,144 | 2/1962 | Harnisch et al. | 274—10 |
| 3,081,093 | 3/1963 | Tiedtke | 274—10 |

NORTON ANSHER, *Primary Examiner.*

JOHN M. HORAN, *Examiner.*

C. B. PRICE, *Assistant Examiner.*